(12) United States Patent　　　(10) Patent No.: US 12,600,861 B2
　　Guido　　　　　　　　　　　　　(45) Date of Patent: Apr. 14, 2026

(54) WATER SOLUBLE INSTRUMENTS AND CONTAINERS

(71) Applicant: Terry Guido, Dallas, TX (US)

(72) Inventor: Terry Guido, Dallas, TX (US)

( * ) Notice: Subject to any disclaimer, the term of this patent is extended or adjusted under 35 U.S.C. 154(b) by 475 days.

(21) Appl. No.: 17/748,321

(22) Filed: May 19, 2022

(65) Prior Publication Data

US 2022/0275210 A1　　Sep. 1, 2022

Related U.S. Application Data

(63) Continuation-in-part of application No. 17/018,118, filed on Sep. 11, 2020, now Pat. No. 12,031,034, which is a continuation of application No. 15/443,753, filed on Feb. 27, 2017, now Pat. No. 10,822,149.

(60) Provisional application No. 63/286,739, filed on Dec. 7, 2021, provisional application No. 63/190,359, filed on May 19, 2021, provisional application No. 62/357,857, filed on Jul. 1, 2016.

(51) Int. Cl.
| | |
|---|---|
| *C08L 89/00* | (2006.01) |
| *B65D 3/04* | (2006.01) |
| *B65D 3/22* | (2006.01) |
| *B65D 3/28* | (2006.01) |
| *B65D 65/46* | (2006.01) |

(52) U.S. Cl.
CPC ................ *C08L 89/00* (2013.01); *B65D 3/04* (2013.01); *B65D 3/22* (2013.01); *B65D 3/28* (2013.01); *B65D 65/466* (2013.01)

(58) Field of Classification Search
CPC ... B65D 3/04; B65D 3/22; B65D 3/28; B65D 65/466; B65D 1/34; B65D 1/40; B65D 43/162; B65D 75/22; A47G 19/00; A47G 21/00; A47G 21/18; A61J 2200/60; C08J 2300/14; C08J 2300/16; C08J 7/0427; D21H 19/84; D21H 27/10
See application file for complete search history.

(56) References Cited

U.S. PATENT DOCUMENTS

| | | | |
|---|---|---|---|
| 3,606,262 | A | 9/1971 | Hoff |
| 5,620,724 | A | 4/1997 | Adler |
| 5,798,152 | A | 8/1998 | Stevens |
| 8,245,848 | B2 | 8/2012 | Tolibas-Spurlock et al. |
| 8,701,905 | B2 | 4/2014 | Warner |
| 8,991,635 | B2 | 3/2015 | Myerscough |
| 9,090,372 | B2 | 7/2015 | Warner |
| 9,126,717 | B2 | 9/2015 | Myerscough |
| 10,822,149 | B1 | 11/2020 | Guido |
| 2003/0216492 | A1 | 11/2003 | Bowden et al. |

(Continued)

FOREIGN PATENT DOCUMENTS

JP　　　　H05239244 A　　　9/1993

*Primary Examiner* — Yan Lan
(74) *Attorney, Agent, or Firm* — Goodhue, Coleman & Owens, P.C.

(57) ABSTRACT

One embodiment provides a disposable tool. The disposable tool may include an exterior layer disposed over one or more dissolvable layers forming a shape of the disposable tool. The exterior layer is coated with an impermeable coating. The disposable tool includes one or more segments that are not coated with the impermeable coating. The disposable tool may be utilized for consumption of food or liquids or as an applicator, such as a tampon applicator.

18 Claims, 16 Drawing Sheets

(56) References Cited

U.S. PATENT DOCUMENTS

2019/0380520 A1 * 12/2019  Wan ....................... A47G 21/18
2020/0407138 A1    12/2020  Guido

* cited by examiner

*FIG. 11*

Form a container from one or more layers that are dissolvable
802

Coat a portion of the container in an impermeable coating
804

Prevent an exterior surface of a recessed bottom raised up from a lip
from being coated
806

Forming a disposable instrument of one or more biodegradable layers
902

Coating a substantial portion of the disposable instrument in an impermeable coating
904

Preventing at least one segment that is distant from user contact and food contact from being coated with the impermeable coating
906

Forming a disposable instrument of one or more biodegradable layers
1002

Embed a strip attached to a tab
1004

Coating a substantial portion of the disposable instrument in an impermeable coating
1006

Preventing at least one segment below the tab from being covered by the impermeable coating
1008

1100

WATER SOLUBLE INSTRUMENTS AND CONTAINERS

RELATED APPLICATION DATA

This patent application claims priority to U.S. Provisional Application No. 63/286,739 entitled Water Soluble Medical Examination Equipment filed on Dec. 7, 2021 and U.S. Provisional Application No. 63/190,359 entitled WATER SOLUBLE INSTRUMENTS AND CONTAINERS filed May 19, 2021, and is a continuation-in-part of the U.S. Non-provisional patent application Ser. No. 17/018,118 entitled "WATER SOLUBLE CONTAINER" filed on Sep. 11, 2020 which is a continuation and claims priority to U.S. Non-provisional patent application Ser. No. 15/443,753 and issued as U.S. Pat. No. 10,822,149 entitled "WATER SOLUBLE, BIODEGRADABLE BEVERAGE CONTAINER" filed on Feb. 27, 2017 which claims priority to U.S. Provisional Application No. 62/357,857 filed on Jul. 1, 2016, all of which are hereby incorporated by reference in their entireties.

BACKGROUND

Disposable products, containers, utensils, and tools are used extensively across the world. As a result, landfill space has been used in large amounts and resource utilization is being viewed with an eye towards efficiency and environmentally friendly options. Increased emphasis is being placed on recycling and biodegradable products. However, conventional disposable, biodegradable products create waste and are costly to recycle. Therefore, what is needed is a biodegradable, eco-friendly products that are biodegradable within a short time frame.

SUMMARY

One or more embodiments provide a disposable tampon applicator or disposable tool. The disposable tampon applicator may include an exterior surface including an impermeable coating. The disposable tampon applicator may include an interior surface that does not include the impermeable coating facilitating dissolution of the disposable tampon applicator from an interior to an exterior.

Another embodiment provides a disposable tool. An exterior layer is disposed over one or more dissolvable layers forming as shape of the disposable tool. The disposable tool is utilized for consumption of food or liquids. The exterior layer is coated with an impermeable coating. A tab is connected to the exterior layer. The tab extends above a segment of the exterior layer that does not include the impermeable coating.

Another embodiment provides a disposable container. The disposable container includes an outer layer disposed over one or more dissolvable layers defining the disposable container. A portion of the outer layer includes an impermeable coating. The disposable container includes a raised bottom extending above a lip. The raised bottom is not coded in the impermeable coating facilitating the dissolution of the disposable container beginning with the raised bottom after usage.

Another embodiment provides an examination cover. The examination cover may include an exterior layer disposed over one or more dissolvable layers of the examination cover. The exterior layers include an impermeable coating. The examination cover may further include an interior surface of the examination cover does not include the impermeable coating facilitating dissolution of the examination cover from the interior surface to the exterior surface.

In other embodiments, the examination cover may be for a medical device. The examination cover may be an ear speculum. The examination cover may be a thermometer cover, a probe cover, or an endoscope cover. The examination cover may include segments wherein at least one of the segments is not covered by the impermeable coating. The at least one of the segments does not enter a body of the user. A rim of the examination cover may be uncoated facilitating separation and dissolution of the exterior surface and the interior surface.

Another embodiment provides a disposable cover. The disposable cover includes an exterior layer disposed over one or more dissolvable layers forming a shape of the disposable cover. The disposable cover covers an examination device and is utilized for examination of a human or animal body. The exterior layer is coated with an impermeable coating. The disposable cover includes a tab connected to the exterior layer. The tab extends above a segment of the exterior layer that does not include the impermeable coating.

In other embodiments, the tab may be connected to a strip for removing the exterior layer and associated impermeable coating to expose the one or more dissolvable layers. The impermeable coating may begin to dissolve after exposure to a liquid or moisture for more than two hours or a heated liquid.

One embodiment provides a container that dissolves. A shell defining the container sized to accommodate a volume of a consumable. The shell is water soluble. The shell defines walls extending upward from a closed bottom. The container includes a first water insoluble layer coating an exterior surface of the walls of the shell. One or more portions of the exterior surface are not coated with the first water insoluble layer promoting the dissolution of the container. The container includes a second water insoluble layer coating an interior of the shell.

In other embodiments, the tool may include internal or external portions that are not coated with the impermeable coating. One or more removable tabs may be integrated above the internal or external portions that are uncoated with the impermeable coating. The tabs may be integrated with a strip or string to remove a portion of the impermeable coating or other layers of the tool or container.

Another embodiment provides a container that dissolves. A shell defining the container sized to accommodate a volume of a consumable. The shell includes an interior layer and an exterior layer with at least one uncoated edge. The shell is water soluble. The shell defines walls extending upward from a closed bottom. A first water insoluble layer coats an exterior surface of the walls of the shell. One or more portions of the exterior surface including a closed bottom are uncoated with the first water insoluble layer to promote the dissolution of the container. The closed bottom connects to the shell. A second water insoluble layer coats an interior of the shell.

Yet another embodiment provides a container. A shell defines at least a portion of the container is sized to accommodate a volume of a consumable. The shell defines walls extending upward from a closed bottom. A water insoluble layer coats an exterior surface of the walls of the shell. One or more portions of the exterior are uncoated with the water insoluble layer promoting dissolution of the container after use. The water insoluble layer coats an interior of the shell.

Some embodiments of the present disclosure include a biodegradable and dissolvable container. The container may comprise a biodegradable and water soluble shell defining the container sized to accommodate a volume of a liquid, the shell having walls extending upward from a closed bottom; an exterior water insoluble layer coating an exterior surface of the walls of the shell; and an inner water insoluble layer coating an interior of the shell, wherein the container may completely dissolve in water over a predetermined period of time.

BRIEF DESCRIPTION OF THE DRAWINGS

Illustrative embodiments of the present invention are described in detail below with reference to the attached drawing figures, which are incorporated by reference herein and wherein:

FIG. 11 is a pictorial representation of a clamshell container in accordance with an illustrative embodiment;

DETAILED DESCRIPTION OF THE DRAWINGS

Figure 1:
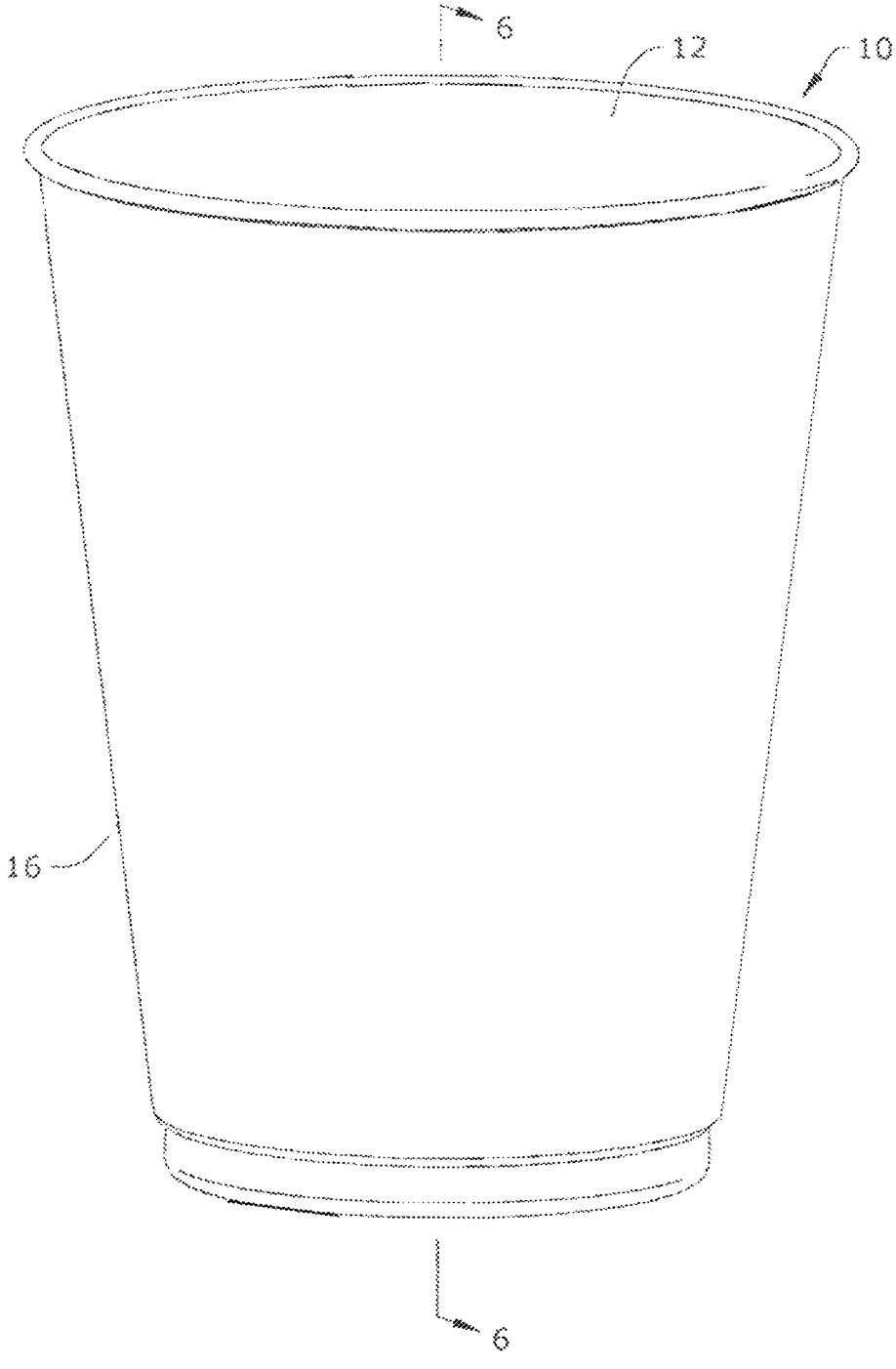
FIG. 1 is a perspective view in accordance with an illustrative embodiment.
Figures 2, 3, 4:
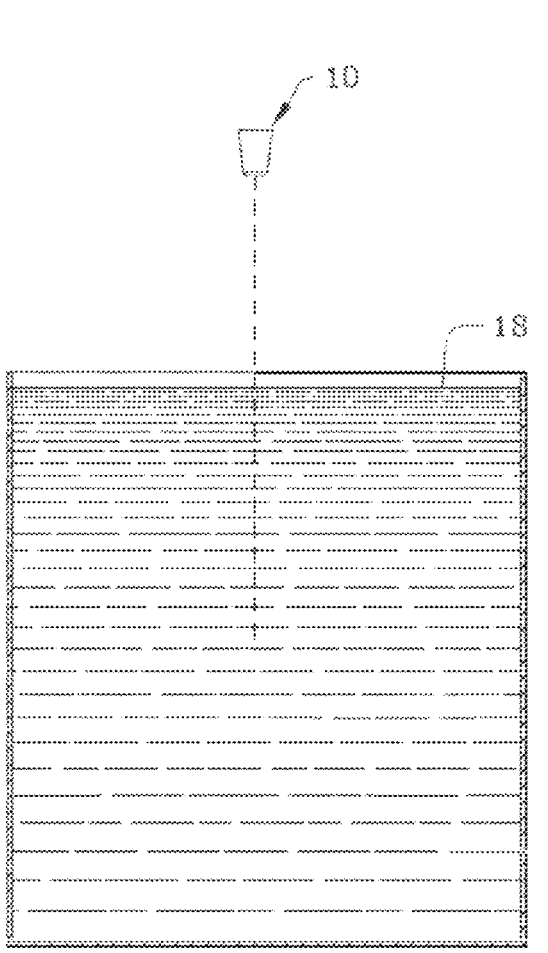
FIG. 2 is an exploded section view in accordance with an illustrative embodiment.
FIG. 3 is a section view in accordance with an illustrative embodiment.
FIG. 4 is a section view in accordance with an illustrative embodiment.
Figure 5:
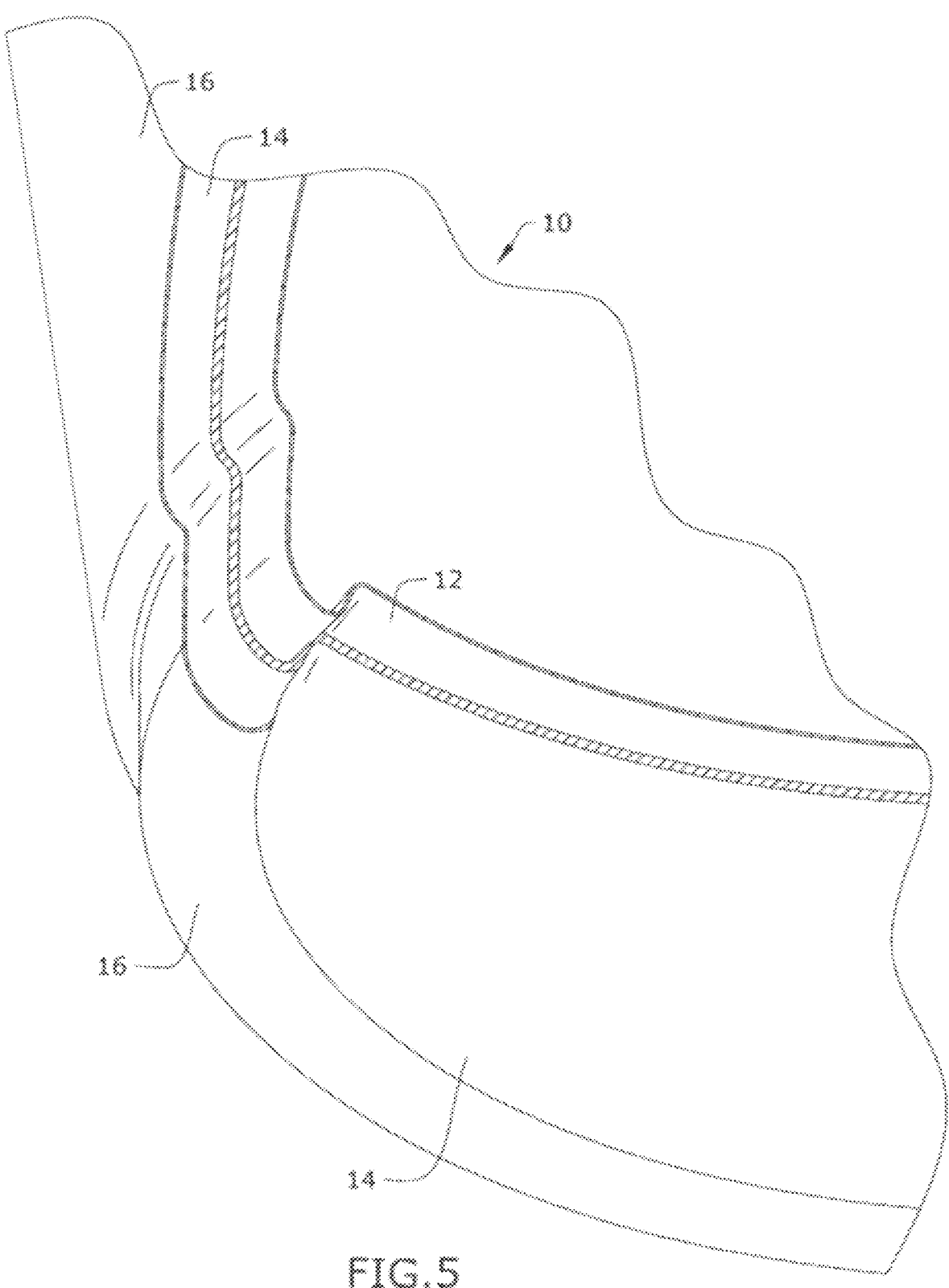
FIG. 5 is a cutaway view in accordance with an illustrative embodiment.
Figure 6:
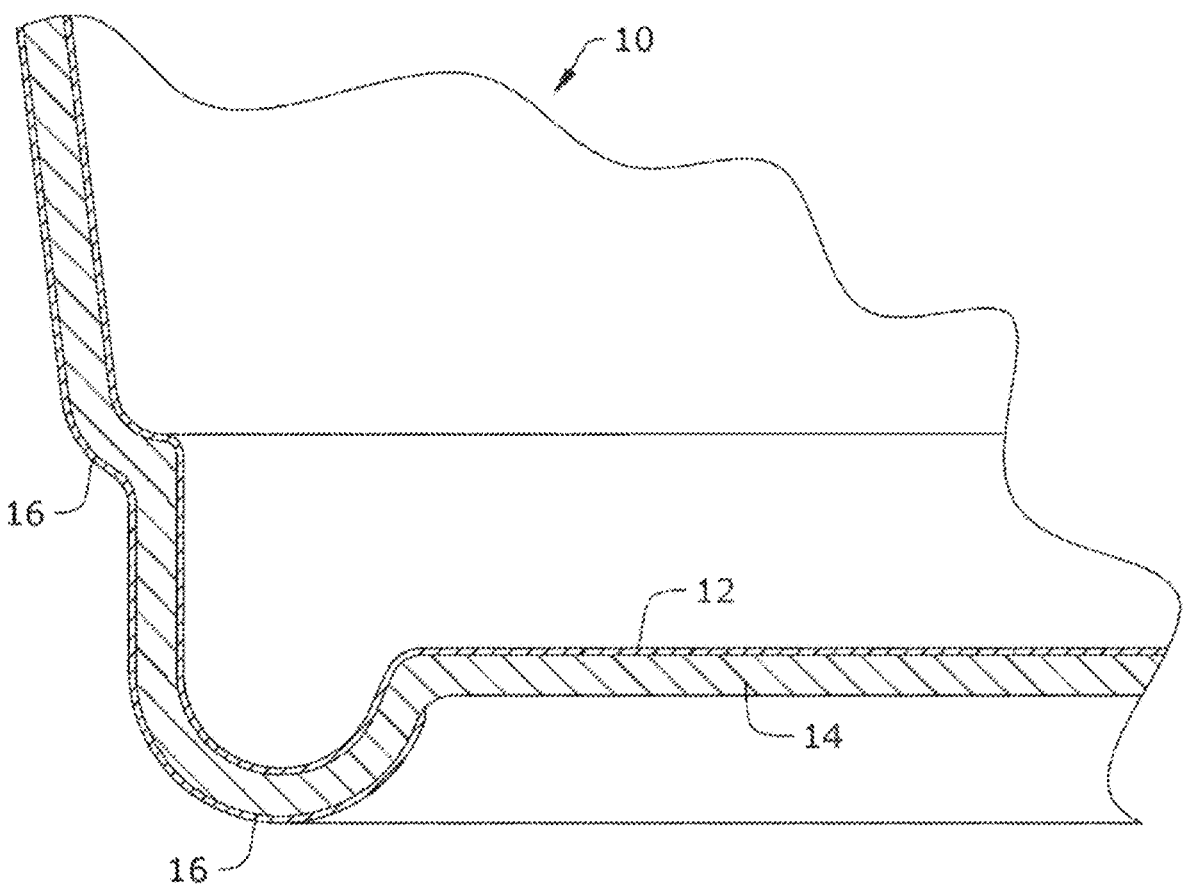
FIG. 6 is a section detail view in accordance with an illustrative embodiment, taken along line 6-6 in FIG. 1.

The illustrative embodiments provide a system, method, devices, instruments, and applicators that readily dissolve in water. The various devices, instruments, objects, and applicators may include tampon applicators, food utensils/cookware, plates, bowls, carry out boxes/clamshells, and so forth. The areas devices may be dissolved in hot water or room temperature water. Alternatively, other liquids or high moisture environments may be utilized to biodegrade/dissolve the instruments or containers. Agitation of the devices may further enhance dissolution. In some embodiments, the various devices may be coated with one or more insoluble layers that are not easily permeated by water. One or more portions of the devices may be purposely uncoated to facilitate dissolution of the devices once used. The one or more uncoated portions of the devices may be strategically positioned, such that the devices fulfill their intended purpose before beginning to dissolve. In another embodiment, the devices may include one or more tabs that may allow a portion of the insoluble coating to be removed from the devices to facilitate a more rapid dissolution. The tab may be easily gripped by the user after using the device to remove a section, strip, or other portion of the device allowing enhanced exposure of the water to the devices.

Portions of the instrument may not be coated with the impermeable coating to ensure or facilitate dissolution. In other embodiments, interior dissolvable layers may be partially coated with a water impermeable coating, surface, pattern, or layer to slow the process. The impermeable layers and water-soluble layers disclosed may be integrated with the instrument or object during the manufacturing process or utilizing a coating. For example, the objects may be formed from layers of materials that have the properties, structure, and functions described. Alternatively, the various layers may be added after the objects are created or during creation.

Applicant specifically note that the various embodiments (e.g., instruments, applicators, devices, methods, etc.) herein described may be combined along with any of their associated features. This combination has already been contemplated and is expected regardless of artificial separations, restrictions, which are subsequently imposed on the various embodiments.

In the following detailed description of the invention, numerous details, examples, and embodiments of the invention are described. However, it will be clear and apparent to one skilled in the art that the invention is not limited to the embodiments set forth and that the invention can be adapted for any of several applications.

In another embodiment, the devices of the present disclosure may be used as a beverage, food, or other container that biodegrades and dissolves completely in water and may comprise the following elements. This list of possible constituent elements is intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device.

Biodegradable Water Insoluble Coating.

Water Soluble and Biodegradable Substrate Layer.

Optional Biodegradable Water-Soluble Pigment.

The various elements of the device of the present disclosure may be related in the following exemplary fashion. It is not intended to limit the scope or nature of the relationships between the various elements and the following examples are presented as illustrative examples only. Any number of cups, bowls, plates, dishes, containers, surgical/medical instruments, self-care objects, applicators, or other objects may be created utilizing the structures, layers, coating, objects, functions, and methods herein described.

By way of example and referring to FIGS. 1-6, some embodiments of the present disclosure include a container 10 that dissolves in water and whose remnants are biodegradable, the container 10 comprising a biodegradable and water soluble shell 14 defining the container 10 sized to accommodate a volume of a liquid, the shell 14 comprising walls extending upward from a closed bottom; an exterior water insoluble layer 16 coating an exterior surface of the walls of the shell 14; and an inner water insoluble layer 12 coating an interior of the shell 14. Thus, the exterior surface of the bottom of the shell 14 may not be coated with the exterior water insoluble layer 16. In some embodiments, the container 10 may be designed to dissolve in water 18 over a predetermined period of time, resulting in a mixture 20 of water 18 and biodegradable materials.

The container 10 of the present disclosure may be made of any suitable materials. In some embodiments, the biodegradable and dissolvable shell 14 may comprise an eco-friendly, biodegradable and water-soluble material, such as polyvinyl alcohol, polyvinyl acetate, and dissolvable paper, such as SMARTSOLVE brand dissolvable paper.

In embodiments, the exterior water insoluble layer 16 and the interior water insoluble layer 12 may comprise the same or different materials. For example, the water insoluble layers 12, 16 may each independently comprise a corn-based sealant, such as FloChemical Zein; a sealant, such as ZIN-SSER brand Sealcoat; or shellac. The exterior water insoluble layer 16 may be mixed with a water soluble pigment, such as a vegetable oil or cornstarch based pigment. Alternatively, a layer of a biodegradable, water insoluble pigment may be sandwiched between the exterior water insoluble layer 16 and the shell 14. In any case, the pigment and the interior and exterior layers may comprise materials that do not initiate the dissolution of the shell 14.

The container 10 of the present disclosure may have any desired shape and size and, in some embodiments, may resemble a beverage container, such as a pint glass. The bottom surface of the container may comprise a raised center portion and a protruding circumference lip extending downward from the raised center portion, wherein the raised center portion may not be coated with the exterior water insoluble layer 16, but the protruding circumference lip may be coated with the exterior water insoluble layer 16. This lip may help prevent the container 10 from beginning to inadvertently biodegrade when the container 10 is placed on a moist or wet surface, such as a table. In a specific example, the lip may keep the raised center portion of the container 10 at least about ⅛" above a table surface. The thickness of the walls of the container 10 may vary, and in some embodiments, may be from about 0.010" to about 0.050", which may be enough to provide structural integrity.

The container 10 of the present disclosure may be manufactured using any suitable method. In some embodiments, such as when the container 10 comprises plastic, the container 10 may be 3D printed, which includes stereolithography, fused deposition modeling, selective laser sintering, selective laser melting, and the like. Alternatively, the container 10 may be molded using, for example, injection molding, vacuum molding, or any other suitable molding method to make a container. In embodiments in which the container 10 comprising the dissolvable paper, a conventional cutting and assembly, such as those used to make conventional paper cups, may be performed, wherein the seams may be sealed or adhered using a non-toxic, biodegradable adhesive, such as MASTERBOND food grade epoxy.

Once the shell 14 is formed into the desired size and shape, the interior water insoluble layer 12 may be coated onto the interior surface of the shell. The inner layer 12 may be applied using any method suitable for obtaining the desired thickness, including brushing, spraying, dipping, swirling, and the like. For example, a corn-based sealant, sealant, or shellac layer may be applied by pouring the coating on the interior of the container 10 and swirling until all of the interior surfaces are covered with a coating of approximately 0.001" in thickness. The coating may be allowed to air dry for several hours and then hot air may be applied to the interior of the container 10 at a temperature of from about 180° F. to about 250° F. for a duration of about 5 to 10 minutes (to denature the com-based coating). These steps may be repeated several times until an overall thickness of about 0.005" is achieved uniformly. This thickness may correspond to approximately 2 hours of waterproof effectiveness.

Before the exterior layer 16 is applied, the bottom surface of the container 10 may be masked to prevent the exterior layer 16 from coating this area. Alternatively, another area of the exterior surface of the shell 14 may be masked and, thus, left uncoated. The exterior layer 16 may be applied until a minimum thickness of about 0.005" is achieved. The exterior layer 16 may be applied using any suitable method, such as brushing. Once the exterior layer 16 is applied, the masking may be removed from the shell 14.

To coat the exterior of a dissolvable paper shell 14 with a corn-based sealant, a plasticizer, such as any fatty oil like olive oil or canola oil, may be added to the corn-based sealant. The plasticizer may be added in an amount equal to the amount of Zein, by weight. For example, in a 10% zein/ethanol solution, 10% by weight of the plasticizer should be added.

To use the container 10 of the present disclosure as, for example, a beverage container, the user may pour liquids and ice into the container 10. The liquid may remain in the container 10 for approximately 2 hours before the container 10 starts dissolving or breaking down. Once the user has finished with the container 10, any remaining contents may be discarded and the container 10 may be placed in a bath of water 18. It may be preferred that the water 18 be warmer than about 20° C. and that the volume of water be at least about 4 to 5 times greater than the volume of the container 10. Additionally heat and water agitation may decrease the time required to dissolve/degrade the container 10. As the container 10 reacts with the water, the uncoated surface of the container 10 starts to dissolve, usually in about 15 minutes to 1 hour. The bottom may detach from the remaining portion of the container, exposing an uncoated edge of the container. Water may then begin to travel between the interior layer 12 and exterior layer 16 through the shell 14, which will begin to dissolve. As the shell 14 dissolves, the structural integrity holding the interior layer 12 and exterior layer 16 together begins to degrade and the thin coating layers 12, 16 begin to fall off in pieces and continue to break down over time (months). The water 18 thus becomes a mixture 20 of water 18 and dissolved plastic or paper and the water insoluble coating remnants, which may be considered non-toxic, biodegradable, and eco-friendly. As a result, the entire mixture 20 may be discarded to the environment.

Figure 7:
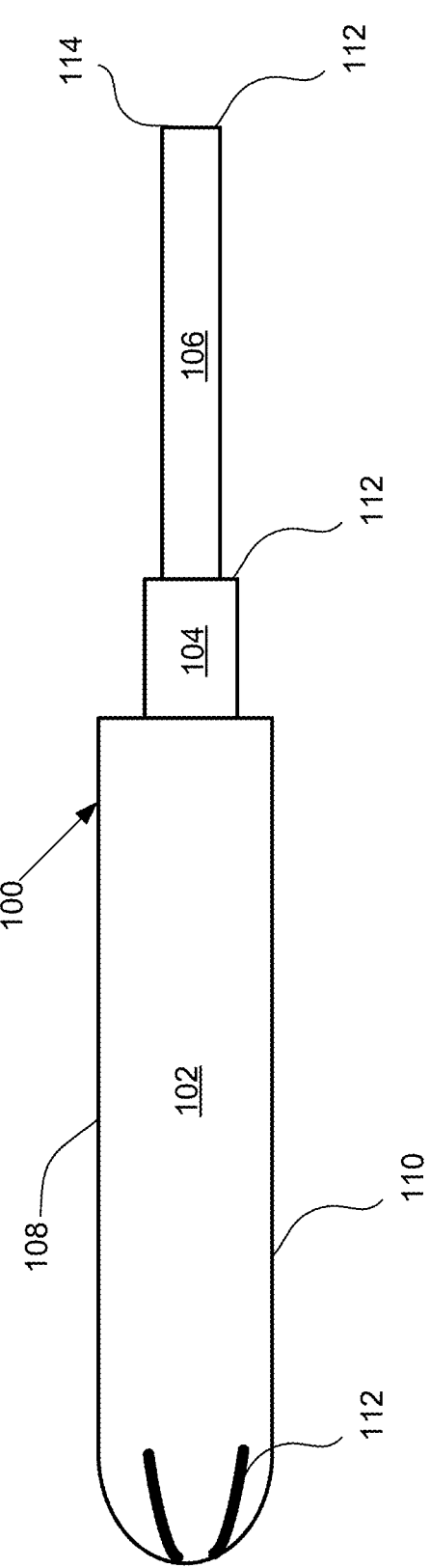
FIG. 7 is a pictorial representation of a dissolvable tampon applicator in accordance with an illustrative embodiment.

The language, layers, coatings and descriptions utilized in FIGS. 1-6 are also similarly applicable to FIG. 7—FIG. 7 is a pictorial representation of a dissolvable tampon applicator 100 in accordance with an illustrative embodiment. As shown, the dissolvable tampon applicator 100 may include multiple segments 102, 104, 106 that function together to deliver a tampon to a user. The segments 102, 104, 16 may represent distinct parts or integrated parts. The size and shape of the tampon applicator 100 may vary based on the manufacturer, size, application, and so forth. For example, segments 102, 104 may be integrated with segment 106 configured to move slidably within segments 102, 104. In one embodiment, the dissolvable tampon applicator 100 may have an exterior surface 108 coated with an impermeable layer 110. The impermeable layer 110 protects the dissolvable tampon applicator 100 from dissolution or break down during storage and utilization. Likewise, the disposable tampon applicator 100 may be individually wrapped, sealed, or otherwise protected (not shown) from humidity, moisture, and other fluids that might prematurely dissolve the disposable tampon applicator. The impermeable layer 110 prevents the dissolvable tampon applicator 100 from dissolving before the disposable tampon applicator 100 is fully utilized.

In one embodiment, the disposable tampon applicator 100 may be hollow. As a result, water, liquid, or moisture may enter from various openings 112 or junction of the disposable tampon applicator 100 (e.g., junction of segments 104, 106). An interior surface 114 of the disposable tampon applicator 100 may be uncoated allowing the disposable tampon applicator 100 to dissolve from the inside out. The interior surface 114 of the disposable tampon applicator 100 does not come in significant contact with a body or fluids of the user during delivery/insertion of a tampon. For example, the tampon may be stored within segment 102 and pushed into the body of the user based on delivery of the segment 106.

In one embodiment, the segment 106 slides within the segments 102 and 104 to expel the tampon from within at least the segment 102 through the openings 112 at the front of the dissolvable tampon applicator 100. For example, the segments 102, 104, 106 may be slidably nested for delivering the tampon to the body of the user. The segments 102 and 104 may be jointed or interconnected. In another embodiment, the segment 106 may be uncoated with an impermeable coating 110 that coats the other portions of the exterior surface 108.

Figure 8:
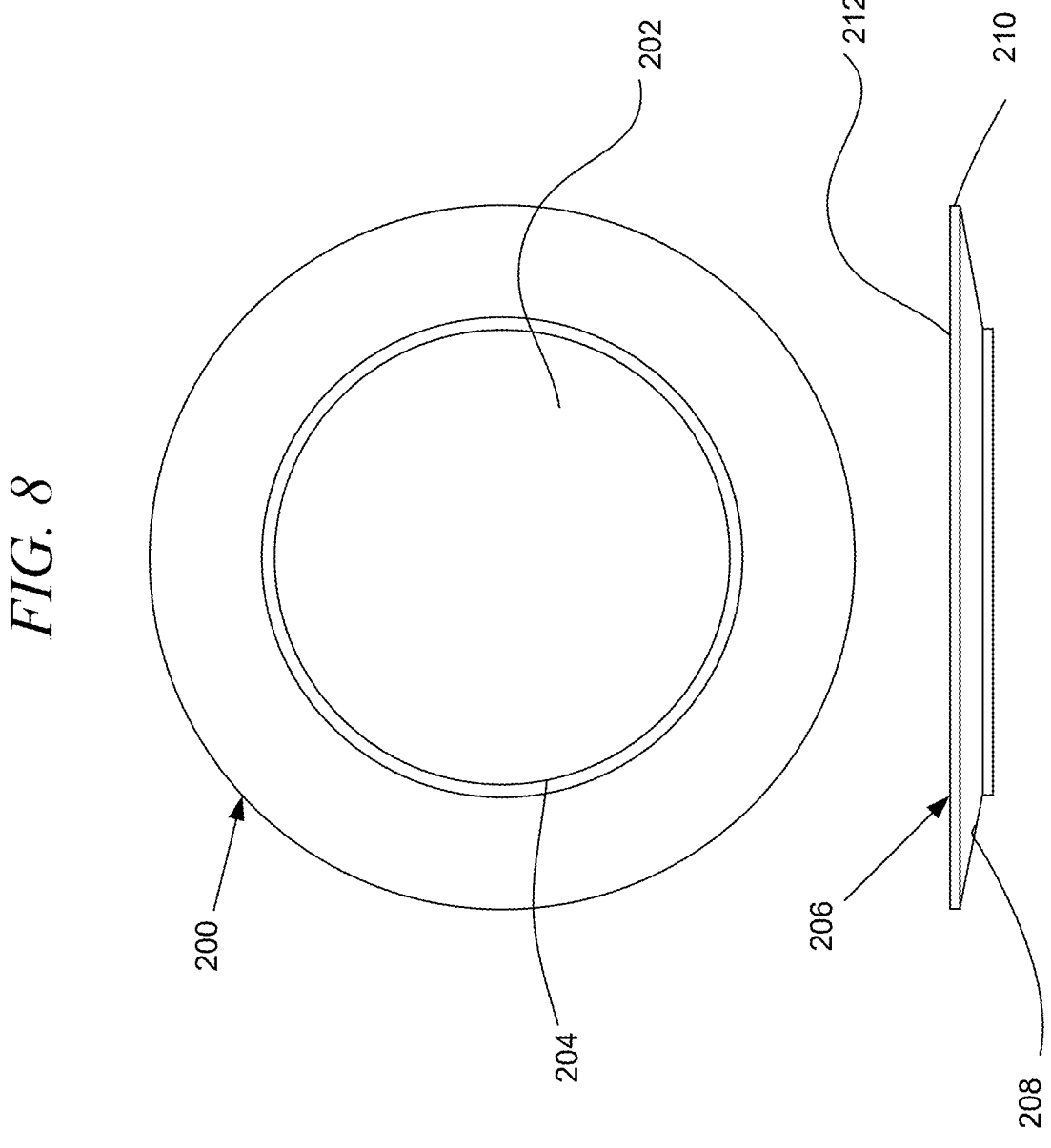
FIG. 8 is a pictorial representation of a disposable plate in accordance with an illustrative embodiment.

FIG. 8 is a pictorial representation of a disposable plate 200 in accordance with an illustrative embodiment. A bottom view and a side view of the disposable plate 200 are shown. The disposable plate 200 is similar to the cups also described. A bottom 202 of the plate 200 is uncoated with an impermeable layer 212. As shown, the bottom 202 is raised above a lip 204. As a result, the bottom 202 does not touch or contact a flat surface when the disposable plate 200 is being utilized. The disposable plate 200 may be dissolved in water with the bottom 202 beginning to dissolve before a top surface 206 including main body 208 and edges 210. In one embodiment, the top surface 206, main body 208, and edges 210 are coated with an impermeable layer 212. The impermeable layer 212 may be configured (e.g., thickness, material, etc.) to remain insoluble for a time period. After the time period the impermeable layer may begin to dissolve.

The disposable plate 200 sits on the circular lip 204 when positioned on a flat surface, such as a dining table, counter, island, floor, or furniture. As a result, the bottom 202 is raised above any surfaces that may be wet or hold moisture causing premature dissolution of the disposable plate 200.

In one embodiment, the bottom 202 may coated with a water-soluble layer. In another embodiment, the bottom 202 may be coated with a thinner layer of the impermeable layer 212.

Figure 9:
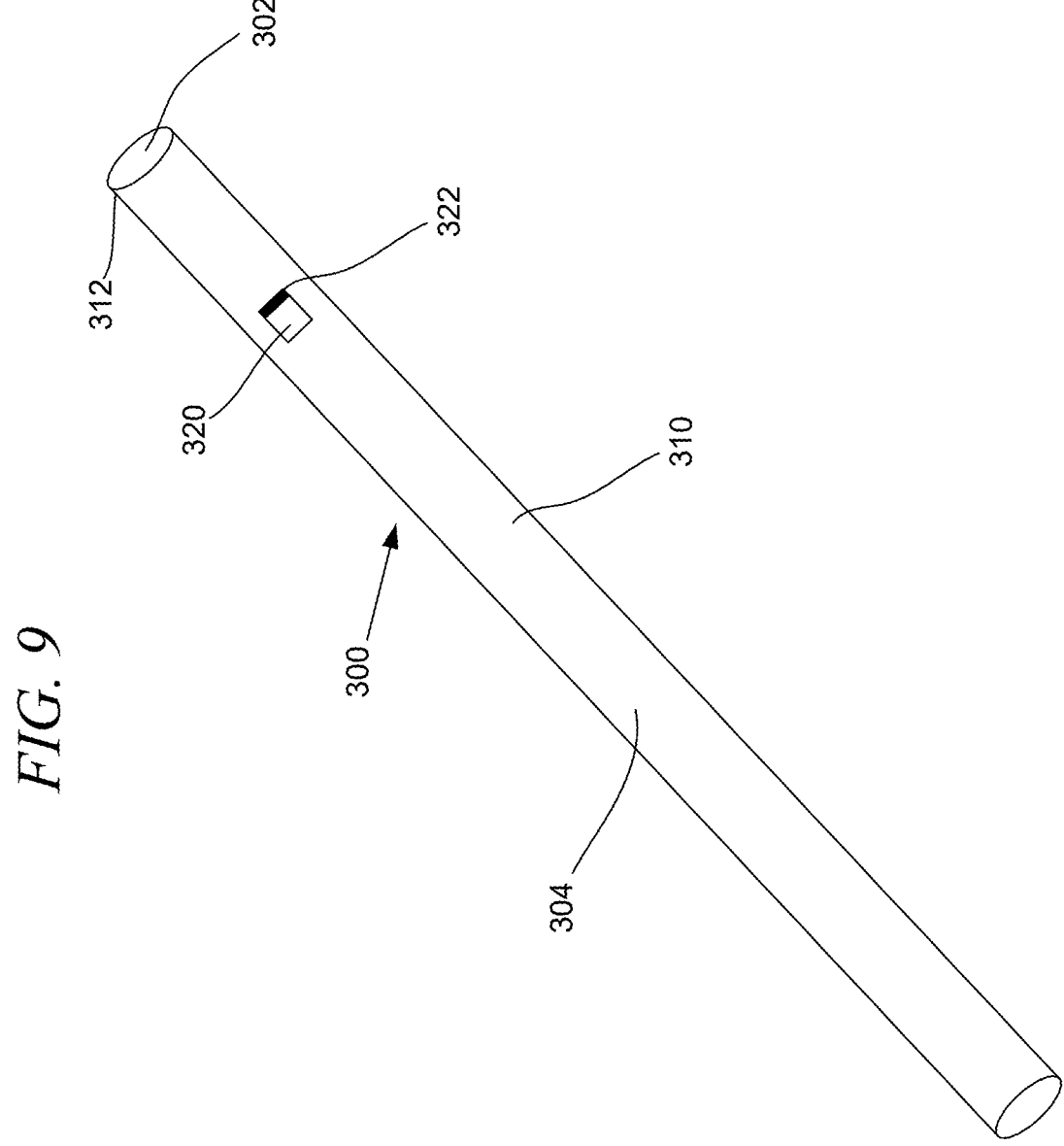
FIGS. 9 and 10 show embodiments of a disposable straw in accordance with illustrative embodiments.
Figure 10:
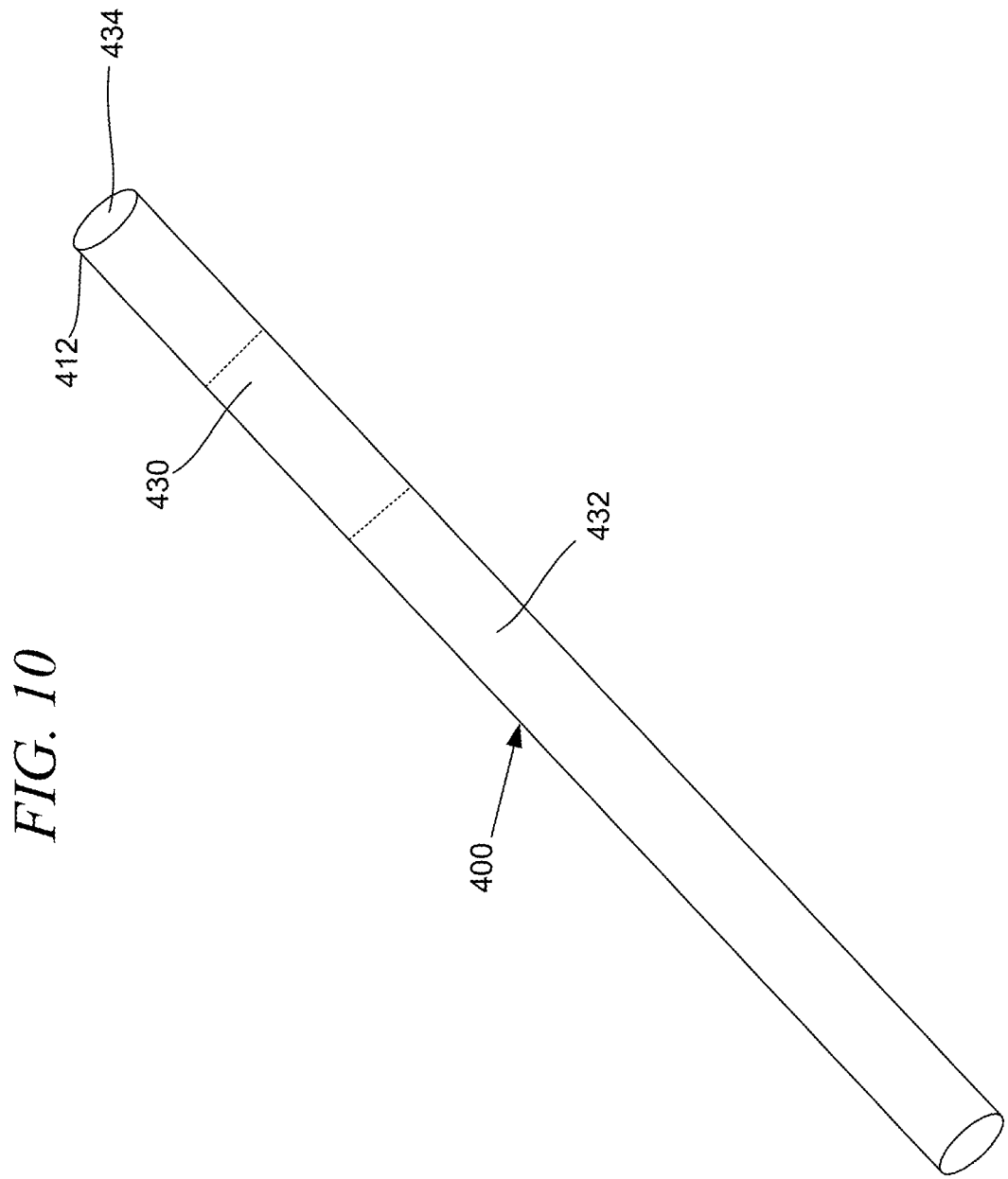

FIGS. 9 and 10 show embodiments of a disposable straw 300, 400 in accordance with illustrative embodiments. The disposable straws 300, 400 may be coated on an interior surface 302 and an exterior surface 304 with an impermeable layer 310. The impermeable layer 310 prevents the disposable straws 300, 400 from dissolving during normal utilization (i.e., a user drinking liquid through the disposable straws 300, 400).

The disposable straw 300 includes a tab 320 that extends from the exterior surface 304. The tab 320 is positioned above a liquid level associated with one or more standard cups when utilized by a user. The tab 320 may be positioned below where the user positions her lips or mouth to extract or suck the liquid from a container through the disposable straw 300. For example, the tab 320 may be positioned approximately 1-3" from a first end 312 of the disposable straw 300. The tab 320 may be utilized to remove a portion of the impermeable layer 310 from the exterior surface 304 so that the disposable straw 300 may more easily dissolve.

The tab 320 may be associated with an uncoated segment 322. Regardless of whether the tab 320 is called to expose more of a dissolvable layer (not shown), the uncoated segment 322 may encourage the dissolution of the disposable straw 300 as exposed to moisture, liquid, or water when misguided or otherwise processed. Liquid may enter through the uncoated segment 322 to dissolve the various layers and coatings of the disposable straw 300. For example, the disposable straw 300 may begin dissolving through the uncoated segment 322.

FIG. 10 shows the disposable straw 400 that may include an uncoated segment 430. Similar to FIG. 3, the uncoated segment 430 may be positioned above a liquid level associated with one or more standard cups when utilized by a user. The uncoated segment 430 may be positioned below where the user positions her lips or mouth to extract or suck the liquid from a container through the disposable straw 400. For example, the uncoated segment 430 may be positioned approximately 1-3" from a first end 412 of the disposable straw 400. The width of the uncoated segment 430 may vary between a few millimeters and approximately one inch even though the size may be greater or smaller. The positioning of the uncoated segment 430 may be configured for users, restaurants, organizations that utilize cups or other containers of a preselected size.

The uncoated segment 430 may allow the various layers/ coatings of the disposable straw 400 to more quickly separate when exposed to water, a liquid, or moisture during post-use processing, dissolution, or while biodegrading. For example, water may enter through the uncoated segment to separate an exterior layer 432 from an interior layer 434. In another example, the disposable straw 400 may represent a single layer that may begin to dissolve beginning at the uncoated segment 430. In yet another example, the disposable straw 400 may include three layers, such as an exterior layer 432, a support layer, and an interior layer 434. In one embodiment, the single layer may include multiple coatings or non-coatings.

Figure 11:
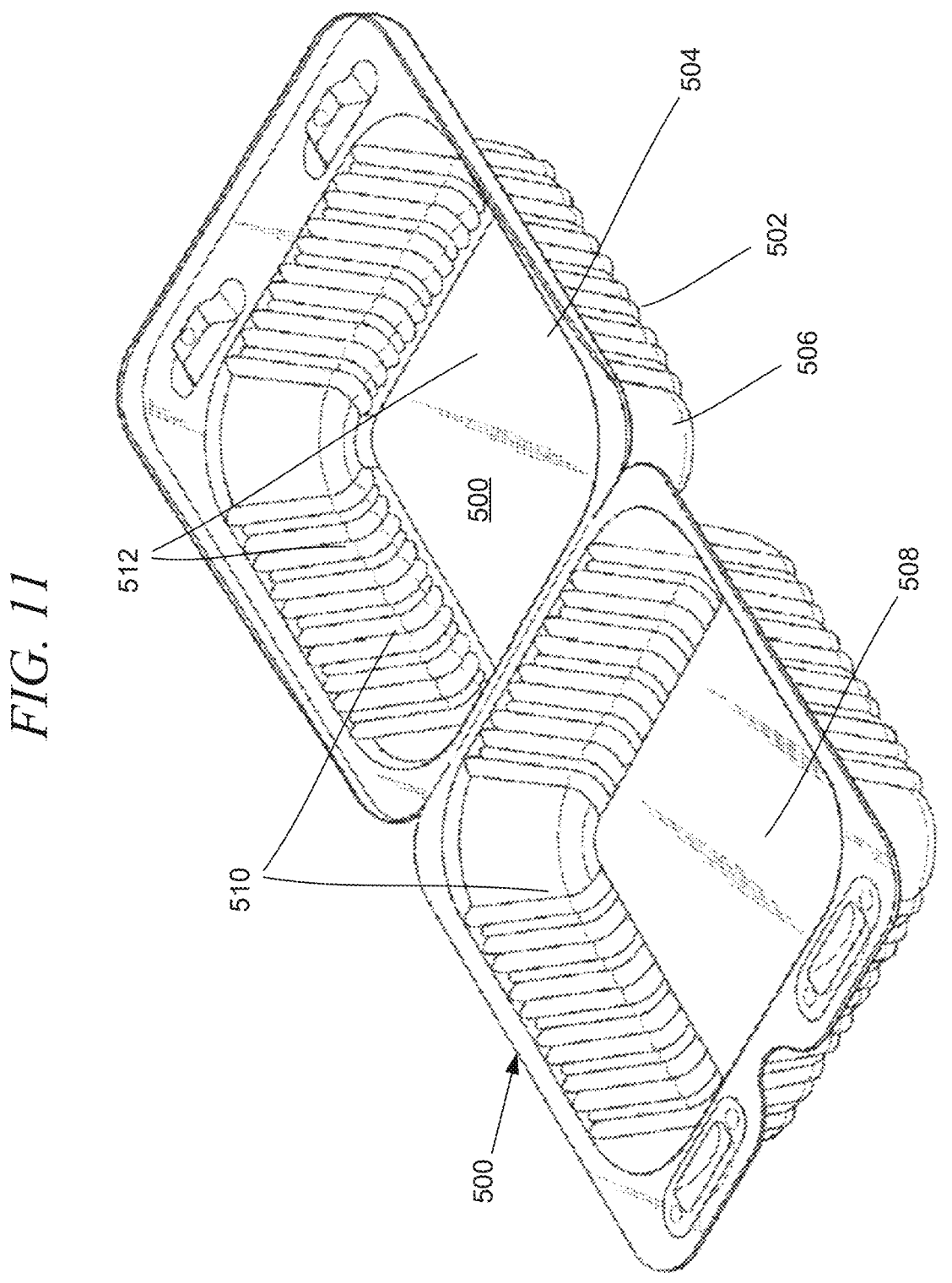

FIG. 11 is a pictorial representation of a clamshell container 500 in accordance with an illustrative embodiment. An exterior surface 502 of a recessed bottom 504 of the clamshell container 500 may be uncoated with an impermeable layer 506 to promote dissolution. The clamshell container 500 may include lips 510. The lips 510 surround the recessed bottom and the recessed top 508 and form the recessed areas formed by the recessed bottom 504 and the recessed top 508. As a result, the clamshell container 500 may sit flat (on either top/bottom) with the recessed bottom 504 or recessed top 508 not touching the surface. As a result, the clamshell container 500 does not start dissolving until desired. Other portions of the clamshell container 500 including the other portions of the exterior surface 502 may be coated with the impermeable layer 506. For example, an exterior surface 502 of a recessed top 508 may be uncoated with the impermeable layer 506. An interior surface 512 of the clamshell container 500 may be coated with the impermeable layer 506 to protect food used as leftovers. The time period for the impermeable layer 506 to begin breaking down may be a week or month because of the potential temporary uses of the clamshell container 500 (e.g., left-overs, take out, etc.).

Figure 12:
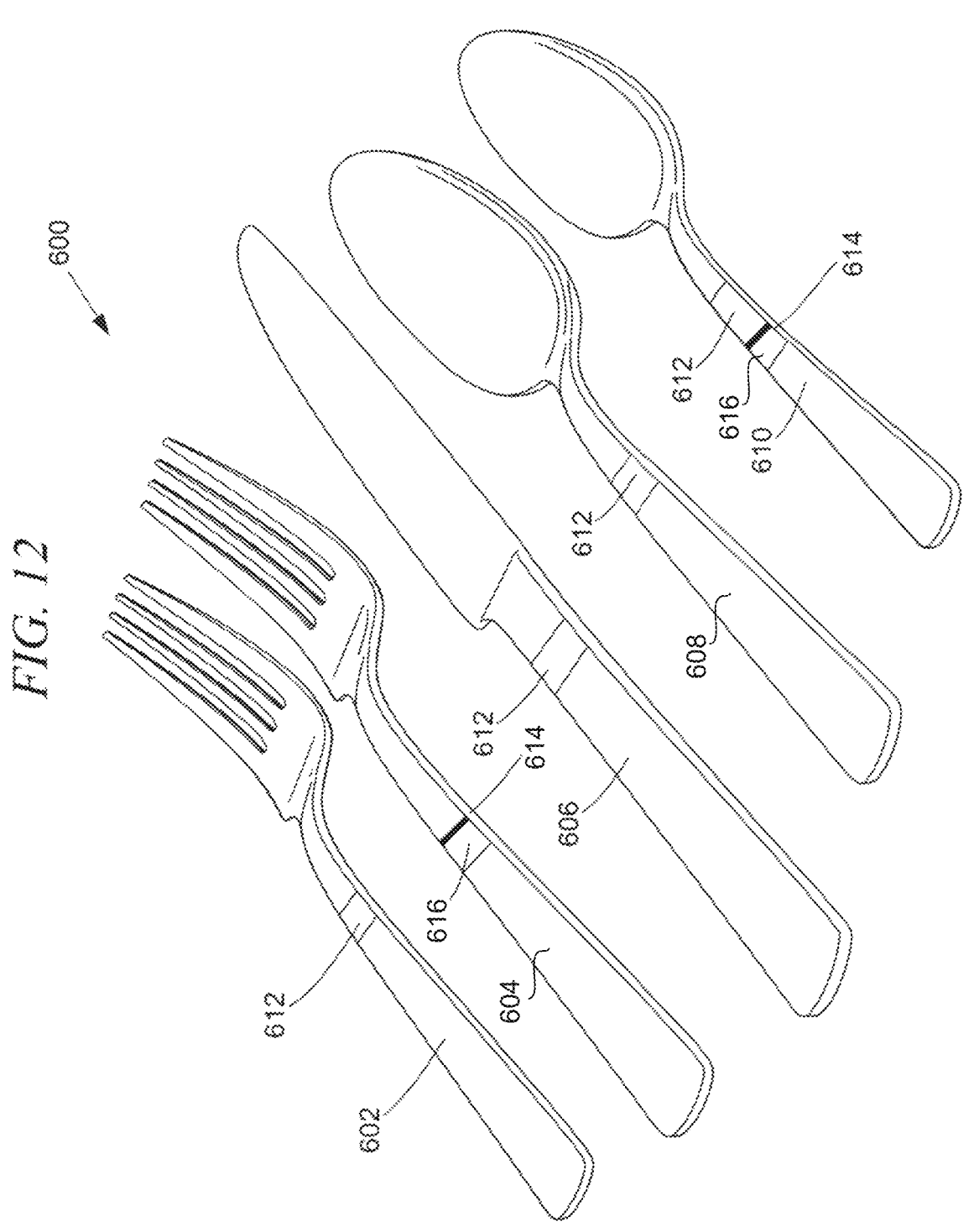
FIG. 12 is a pictorial representation of silverware in accordance with illustrative embodiments.

FIG. 12 is a pictorial representation of silverware 600 in accordance with illustrative embodiments. In one embodiment, the silverware 600 may include utensils 602, 604, 606, 608, 610 that are disposable. The silverware 600 may include any number of utensils, tools, or food serving instruments (e.g., forks, spoons, knives, ladles, spatulas, etc.). The silverware 600 may include uncoated segments 612, 614 and/or tabs 616.

In one embodiment, water, liquids, or moisture may enter the silverware 600 through the uncoated segments 614 to being dissolving the silverware 600 regardless of whether the tabs 616 are utilized to further expose interior layers and surfaces of the silverware 600 that enable the silverware 600 to be dissolved. The silverware may include any number of impermeable layers and coatings that dissolve over time as facilitated through the uncoated segments 612, 614.

The silverware 600 may include one or more uncoated segments 612, 614. The uncoated segments 612 and 614 are positioned away from the functional ends of the silverware 600 to present premature dissolution.

Figures 13A, 13B:
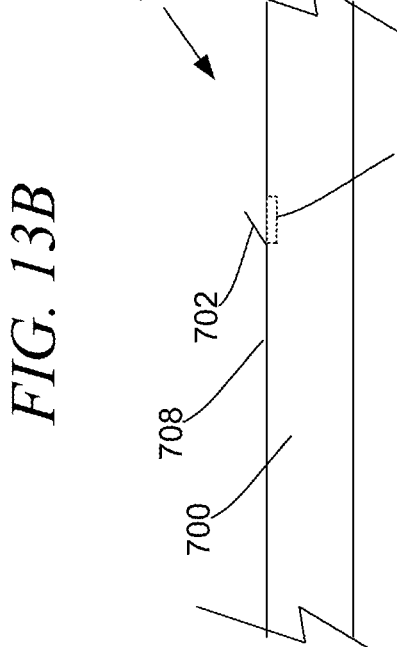
FIGS. 13A-B are pictorial representation of a surface in accordance with illustrative embodiments.

FIGS. 13A-B are pictorial representation of a surface 700 in accordance with an illustrative embodiment. FIG. 13A is a top view of a tab 702 and uncoated segment 704 in accordance with an illustrative embodiment. The surface 700 may represent a portion or segment of any of the applicators, tools, instruments, utensils, devices, or embodiments herein described or shown (e.g., FIGS. 7-12) referred to generically as object 706. FIG. 13B shows a side view. A user may grip the tab 702 and pull it to remove an exterior surface 708 to expose inner layers or edges of the applicable object to promote the dissolution of the object 706.

Figures 13C, 13D:
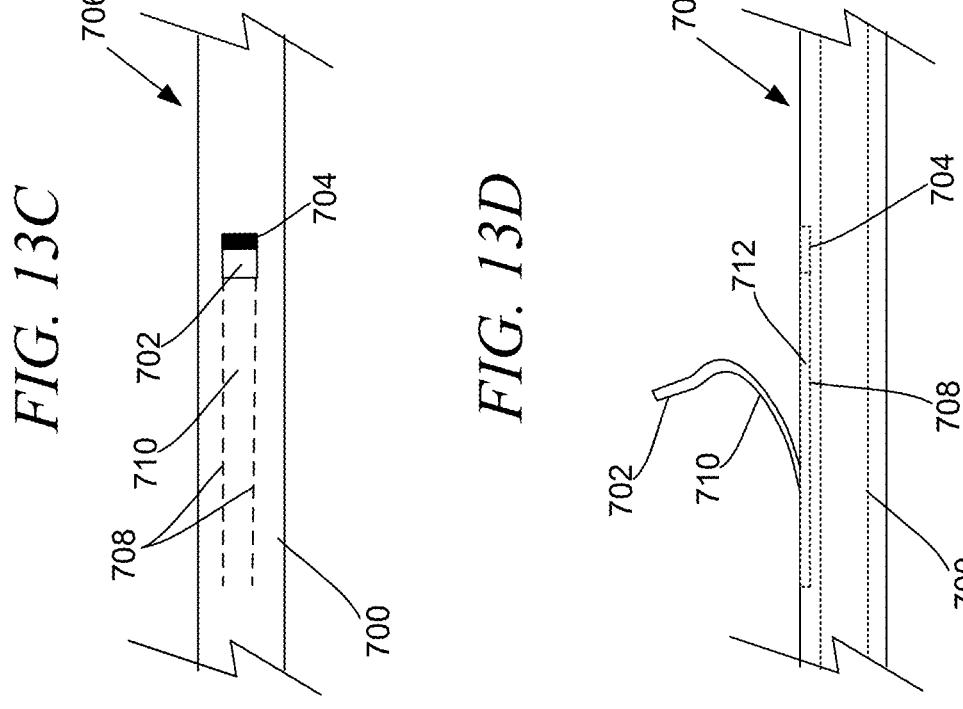
FIGS. 13C-D are pictorial representation of a surface in accordance with other illustrative embodiments.

FIG. 13C illustrates a version of the surface 700 that may include perforations 708 for easily removing a portion 710 of the surface 700. The perforations 708 may represent small holes or slits defined in the surface 700 for easily removing the portion 710 using the tab 702. The perforations 708 may alternatively represent a thinner portion of the exterior surface, coating, or layer. The tab 702 may also be attached to or integrated with a string, tape, or strip below the exterior surface that is stronger than the exterior surface for tearing an opening/strip in the surface 700. Alternatively, the tab 702 may be sufficient to remove the portion 710 of the surface 700 without the need for perforations or other introduced weaknesses.

As shown in FIG. 13D, the portion 710 may be removed or separated from the surface 700 to expose the uncoated segment 704 and/or interior layers 712 (e.g., middle layers, support layers, interior layers, etc.) of the surface 700 of the object 706. As a result, the object 706 may more quickly dissolve or be processed.

Figure 14:
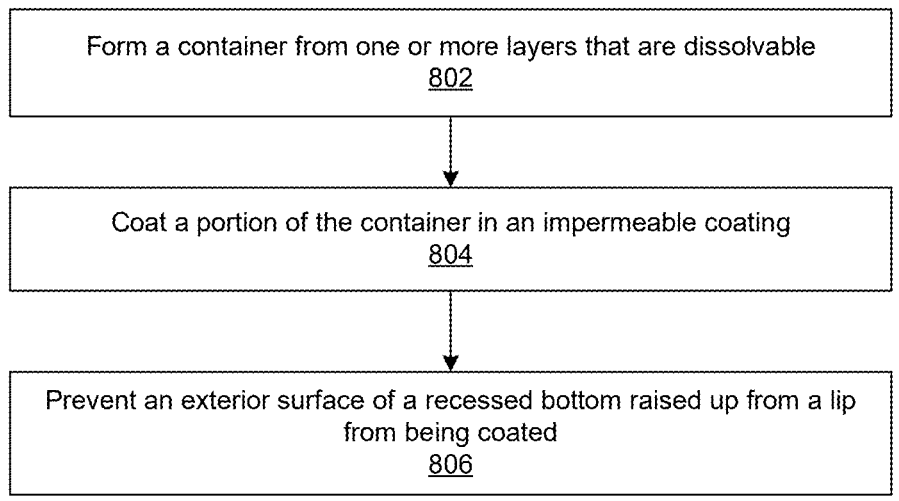
FIG. 14 is a flowchart of a process for creating a container in accordance with an illustrative embodiment.

FIG. 14 is a flowchart of a process for creating a container in accordance with an illustrative embodiment. The process of FIGS. 8 and 9 may be implemented by molding equipment, spray equipment, and so forth referred to generally as a system. The container may represent a disposable plate, clamshell, food container, bowl, or so forth. The process may begin by forming a container from one or more layers that are dissolvable (step 802). In one embodiment, the inner layers may be readily dissolved. For example, the inner layers may be formed from materials that are easily dissolved. In many containers one to four layers may be utilized for the container.

Next, the system coats a portion of the container in an impermeable coating (step 804). The container may be coated utilizing any number of spray, dip, paint, or gas injection systems and methods. The impermeable coating may be impermeable to moisture for a period of time or until exposed to certain conditions, such as heated water, at which time it will begin to dissolve and completely dissolve into environmentally friendly components.

The system prevents an exterior surface of a recessed bottom raised up from a lip from being coated with the impermeable coating (step 806). In one embodiment, a portion of the container or object may be cover with tape, a mask, a blocker, adhesive, strap, or other component to prevent one or more segments from being coated with the impermeable coating. As previously shown, a designated segment, recessed top/bottom, or other portion of the container or object may be uncoated to encourage the container dissolving. The lip may prevent the recessed bottom from being exposed to moisture on a table, counter, in a bag, in a refrigerator, or in other locations so that the container does not begin to prematurely dissolve. The lip prevents the recessed bottom from being positioned against an applicable surface. As a result, the container may more quickly dissolved beginning with the recessed bottom once exposed to significant water, liquid, or moisture. In one embodiment, a blank, tape, plate, or cover may be utilized to cover one or more portions of the container that are not to be exposed or coated with the impermeable coating. Alternatively, selective spraying or application of the impermeable coating may be utilized. In other embodiments, the container may include other uncoated portions, such as an exterior surface of a recessed top (e.g., disposable clamshell), handles, sides, or so forth.

Figure 15:
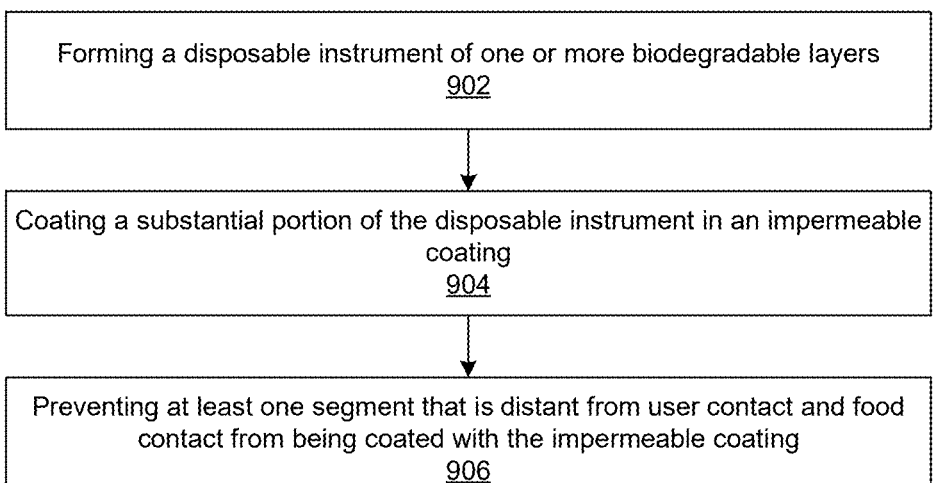
FIG. 15 is a flowchart of a process for creating a disposable instrument in accordance with an illustrative embodiment.

FIG. 15 is a flowchart of a process for creating a disposable instrument in accordance with an illustrative embodiment. The process may begin by forming a disposable instrument of one or more biodegradable layers (step 902). The biodegradable layers may represent layers that readily dissolved in liquid, water, or when exposed to sustained moisture. The disposable instrument may represent utensils (e.g., knives, forks, spoons, etc.), cooking utensils (e.g., spatulas, ladles, serving spoons, whisks, etc.), straws, and other disposable instruments or tools.

Next, the system coats a substantial portion of the disposable instrument in an impermeable coating (step 904). Any number of sprays, brushes, chemical or aerosol deposition, applicators, or other systems may be utilized to apply the impermeable coating.

Next, the system prevents at least one segment that is distant from user contact and food contact from being coated with the impermeable coating (step 906). Any number of tapes, covers, wraps, blanks, attachments, or so forth may be utilized to ensure that the at least one segment is not covered with the impermeable coating. The at least one segment may be protected from receiving all or a portion of the impermeable coating during step 904. In other embodiments, the at least one segment may be coated with the impermeable coating to a lesser degree to ensure that it begins to dissolve first. The impermeable coating may also be referred to as a semi-impermeable coating because of its ability to prevent liquid, water, or moisture from penetrating the disposable instrument for a time.

Figure 16:
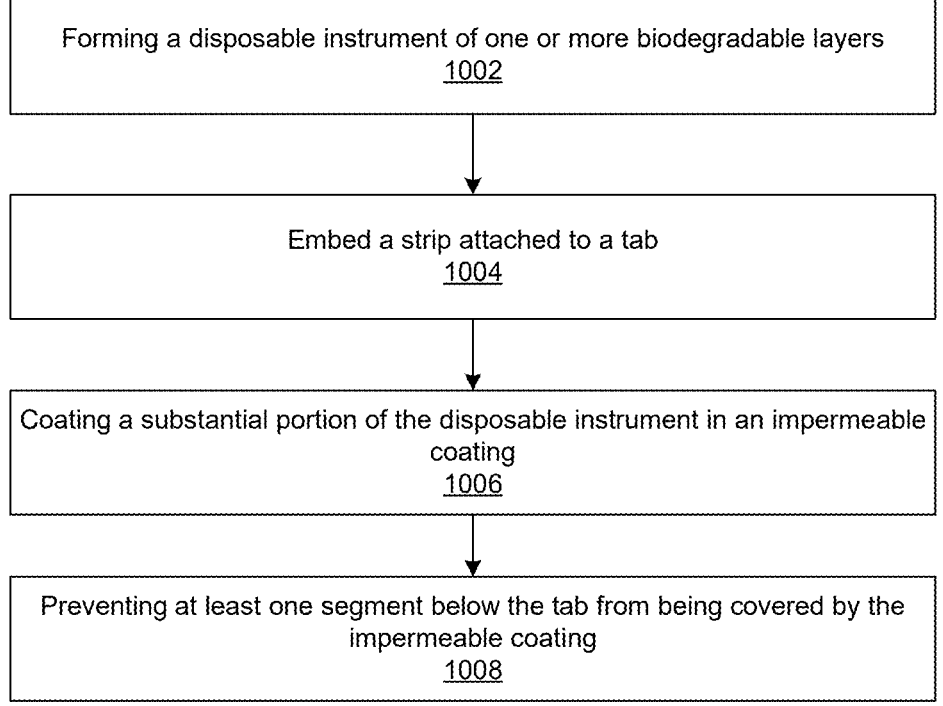
FIG. 16 is a flowchart of a process for creating a disposable instrument including a tab for enhanced dissolution in accordance with an illustrative embodiment.

FIG. 16 is a flowchart of a process for creating a disposable instrument including a tab for enhanced dissolution in accordance with an illustrative embodiment. The process may begin by forming a disposable instrument of one or more biodegradable layers (step 1002). As previously noted, any number of layers may be utilized.

Next, the systems embed a strip attached to a tab (step 1004). The strip may be integrated or positioned on the biodegradable layers. In one embodiment, the tab may be positioned distant from user contact and food contact. For example, for utensils, the tab may be positioned below the handle and above the neck where not frequently gripped by a user. The tabs may be on front surface or back surface of the utensils. The tab may also be integrated into a material or layer utilized to form the container, object, or instrument. In other embodiments, the disposable instrument, container, tool, or other object may include multiple tabs. For straws, the tab may be approximately 1-3" below the drinking end of the straw. The tab may be pulled or lifted by a user along with the associated strip to remove a portion of the impermeable coating or layer thereby exposing more of the disposable instrument to water for biodegradation or dissolution in a solvent, such as water, hot water, liquids, or other high moisture environments. The tab may extend slightly from an exterior surface to be easy to grab. In another embodiment, the tab may include a finger or tool ring for easily removing it from the object or container.

Next, the system coats a substantial portion of the disposable instrument in an impermeable coating (step 1006). The coat may be applied through spray, aerosol/chemical deposition, dipping, or otherwise applied to the disposable instrument. In one embodiment, the coating may represent an additional insoluble layer.

The system prevents at least one segment below the tab from being covered by the impermeable coating (step 1008). The uncoated segment may be positioned below or proximate the tab. In one embodiment, the uncoated segment may be exposed by prying up or positioning the tab as part of the process. The tab may extend slightly at an angle from the surface of the disposable instrument to be more easily recognized and gripped by a user. As noted, the at least one segment, layer, or surface. As a result, the disposable instrument may quickly dissolve even if the tab is not removed from the disposable instrument.

Figure 17:
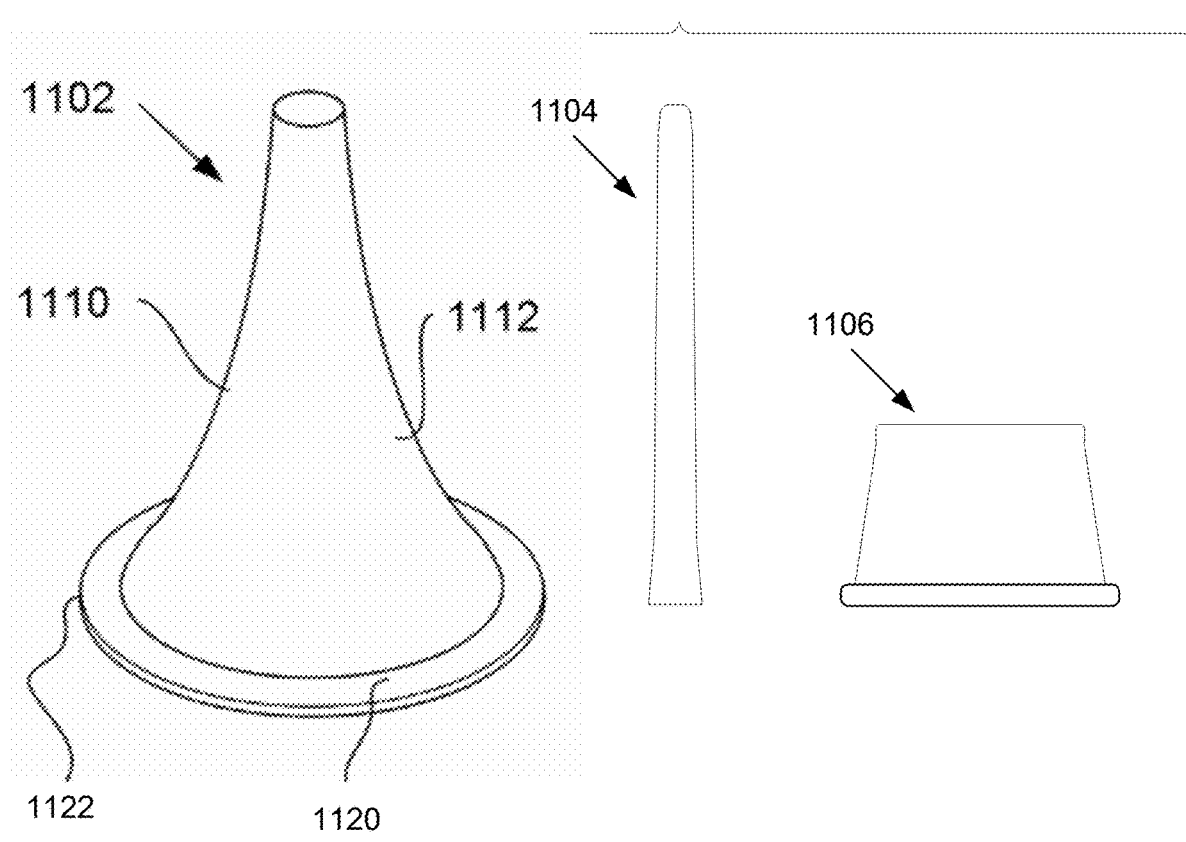
FIG. 17 is a pictorial representation of water-soluble ear examination equipment in accordance with illustrative embodiments.
Figure 17:
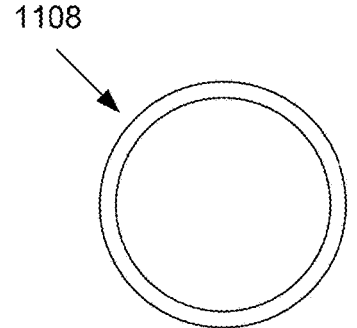

FIG. 17 is a pictorial representation of water-soluble ear examination equipment in accordance with illustrative embodiments. Various equipment and covers 1100 are shown in FIG. 17. The covers 1100 may represent disposable covers for medical examination equipment, such as measurement devices, endoscopes, cameras, sensors, transducers, thermometers, probes, or other equipment utilized by medical professionals or utilized by individuals in any number of locations. The covers 1100 may be utilized for examination of the human body, animals, mechanical devices, structures, electronic equipment, or other living or non-living entities, components, and elements. For example, the covers 1100 may be utilized to examine the ears, eyes, nose, vagina, rectum, skin, wounds, incisions, or other portions of human or animal bodies.

The covers 1100 are configured to be water soluble to decrease significant medical waste. In some embodiments, the covers 1100 may be dissolved in a toilet, sink, bowl, compost heap, outdoor disposal, or so forth to reduce unwanted landfill utilization. In one embodiment, the covers 1100 include an ear speculum 1102, a probe cover 1104, a thermometer cover 1106, and a flexible cover 1108. The covers may be rigid, semi-rigid, or flexible.

In one embodiment, an exterior surface 1110 of the ear specula 1102 may include a coating 1112 so that it does not immediately dissolve when exposed to water or other liquids. The coating 1112 may represent an impermeable layer, semi-permeable layer, or temporarily impermeable layer. The coating 1112 and the associated exterior surface 1110 are dissolvable over time. The coating 1112 and the exterior surface 1110 will dissolve given hours and days. An interior surface 1120 of the ear specula 1102 may be uncoated for facilitating dissolution of the ear specula after-use. The interior surface 1120 is uncoated completely or in part (e.g., segments that are coated and uncoated, portions that are uncoated and uncoated, tabs, etc.). The description of the various coated and uncoated surfaces of the ear specula 1102 may be similarly applicable to the covers 1100.

In one embodiment, all or portions of a rim 1122 (or external edge/opening) of the specula may be uncoated for facilitating dissolution of the ear specula. The rim 1122 may be solid or may be curved in on itself. The rim 1122 may allow liquids to permeate the ear specula 1102 to separate the interior surface 1120 from the exterior surface 1110 for complete dissolution.

The flexible cover 1108 may be rolled over a medical device, examination device, or other similar device, equipment, or component. The flexible cover 1108 may be cylindrically shaped (e.g., similar to a condom when rolled into position). The flexible cover 1108 may also be pre-shaped to fit the applicable device, such as an endoscope. The exterior surface and interior surface of the flexible cover 1108.

As shown, the respective covers 1100 may be nested within similar covers for storage, shipment, or placement. As a result, uncoated portions of the covers 1100 may be protected from moisture during storage, shipment, or placement prior to utilization. The covers 1100 may also include tabs or uncoated segments as described herein. The various embodiments may be combined with various features and functions combined and are expected to be combined across Figures and descriptions regardless of distinctions, restrictions, or other categorizations that may be subsequently applied.

The previous detailed description is of a small number of embodiments for implementing the invention and is not intended to be limiting in scope. The following claims set forth a number of the embodiments of the invention disclosed with greater particularity.

What is claimed:

1. A disposable tool, comprising:

an exterior layer disposed over one or more dissolvable layers forming a shape of the disposable tool, the disposable tool is utilized for consumption of food or liquids, the exterior layer is coated with an impermeable coating; and a tab connected to the exterior layer, the tab extends in part above a segment of the exterior layer that does not include the impermeable coating, the tab is configured to be removed by a user to expose an area of the one or more dissolvable layers to promote dissolution of the disposable tool.

2. The disposable tool of claim 1, wherein the tab is connected to a strip for removing the exterior layer and associated impermeable coating to expose the one or more dissolvable layers.

3. The disposable tool of claim 1, wherein the impermeable coating is configured to prevent dissolution and begins to dissolve after exposure to a liquid or moisture for more than two hours or a heated liquid.

4. The disposable tool of claim 1, wherein the disposable tool is a piece of silverware.

5. The disposable tool of claim 1, wherein the disposable tool is a straw.

6. The disposable tool of claim 1, wherein one or more perforations outline the tab for more easily removing the tab from the disposable tool to expose the one or more dissolvable layers.

7. The disposable tool of claim 1, wherein the exterior layer is the impermeable coating.

8. The disposable tool of claim 1, wherein the impermeable coating comprises a coating selected from the group consisting of a corn-based sealant, a sealant, and a shellac.

9. The disposable tool of claim 1, wherein a portion of a handle of the disposable tool is uncoated with the impermeable coating.

10. The disposable tool of claim 9, wherein the portion of the handle is associated with the tab.

11. The disposable tool of claim 1, wherein the disposable tool dissolves in a heated liquid.

12. The disposable tool of claim 1, wherein the disposable tool is configured to begin to dissolve after at least two hours.

13. A disposable tool, comprising:

an exterior layer disposed over one or more dissolvable layers forming a shape of the disposable tool, the disposable tool is utilized for consumption of food or liquids, a handle extends from at least one end of disposable tool, the exterior layer is coated with an impermeable coating; and a tab connected to the exterior layer, the tab extends in part above a segment of the exterior layer that does not include the impermeable coating, the tab is configured to be removed by a user to expose an area of the one or more dissolvable layers to promote dissolution of the disposable tool.

14. The disposable tool of claim 13, wherein the tab is positioned on the handle.

15. The disposable tool of claim 13, wherein at least a portion of the handle is uncoated with the impermeable coating.

16. The disposable tool of claim 13, wherein the disposable tool dissolves in a heated liquid.

17. The disposable tool of claim 13, wherein the disposable tool is configured to dissolve after at least two hours.

18. The disposable tool of claim 13, wherein the tab is configured to be removed from the handle exposing one or more interior layers of the disposable tool.

\* \* \* \* \*